United States Patent [19]

Blaauw

[11] Patent Number: 5,073,426

[45] Date of Patent: Dec. 17, 1991

[54] CORE ARRANGEMENT IN MINERAL WOOL SANDWICH PANEL

[75] Inventor: Kasper Blaauw, Tolbert, Netherlands

[73] Assignee: Hunter Douglas International N.V., Willemstad, Netherlands Antilles

[21] Appl. No.: 518,897

[22] Filed: May 4, 1990

[30] Foreign Application Priority Data

May 4, 1989 [GB] United Kingdom ............... 8910220

[51] Int. Cl.$^5$ .............................................. B32B 3/10
[52] U.S. Cl. ....................................... 428/56; 428/60; 428/74; 428/76; 428/99
[58] Field of Search .................. 428/74, 60, 53, 56, 428/48, 49, 76, 99

[56] References Cited

U.S. PATENT DOCUMENTS 3,928,097 12/1975 Sauder et al. ..................... 428/74
4,238,257 12/1980 Remi et al. ........................ 428/195

Primary Examiner—Alexander S. Thomas
Attorney, Agent, or Firm—Pennie & Edmonds

[57] ABSTRACT

A sandwich panel element comprises a core 10 of fibrous material arranged between first and second parallel outer skins of generally planar sheet material 30, 32. The core material consists of a plurality of elongate strips 12a, 12b, 12c etc. arranged in side-by-side and end-to-end abutting relationship. The strips are formed so that the fibers are in a direction generally transverse to the planes of the sheet material 30, 32. The strips 12a, 12b, 12c etc. are individually shorter than the length or width of the panel element and the mutually abutting ends 25 of the strip are chamfered at an acute angle to the longitudinal direction of the strips to allow the ends to overlap.

7 Claims, 2 Drawing Sheets

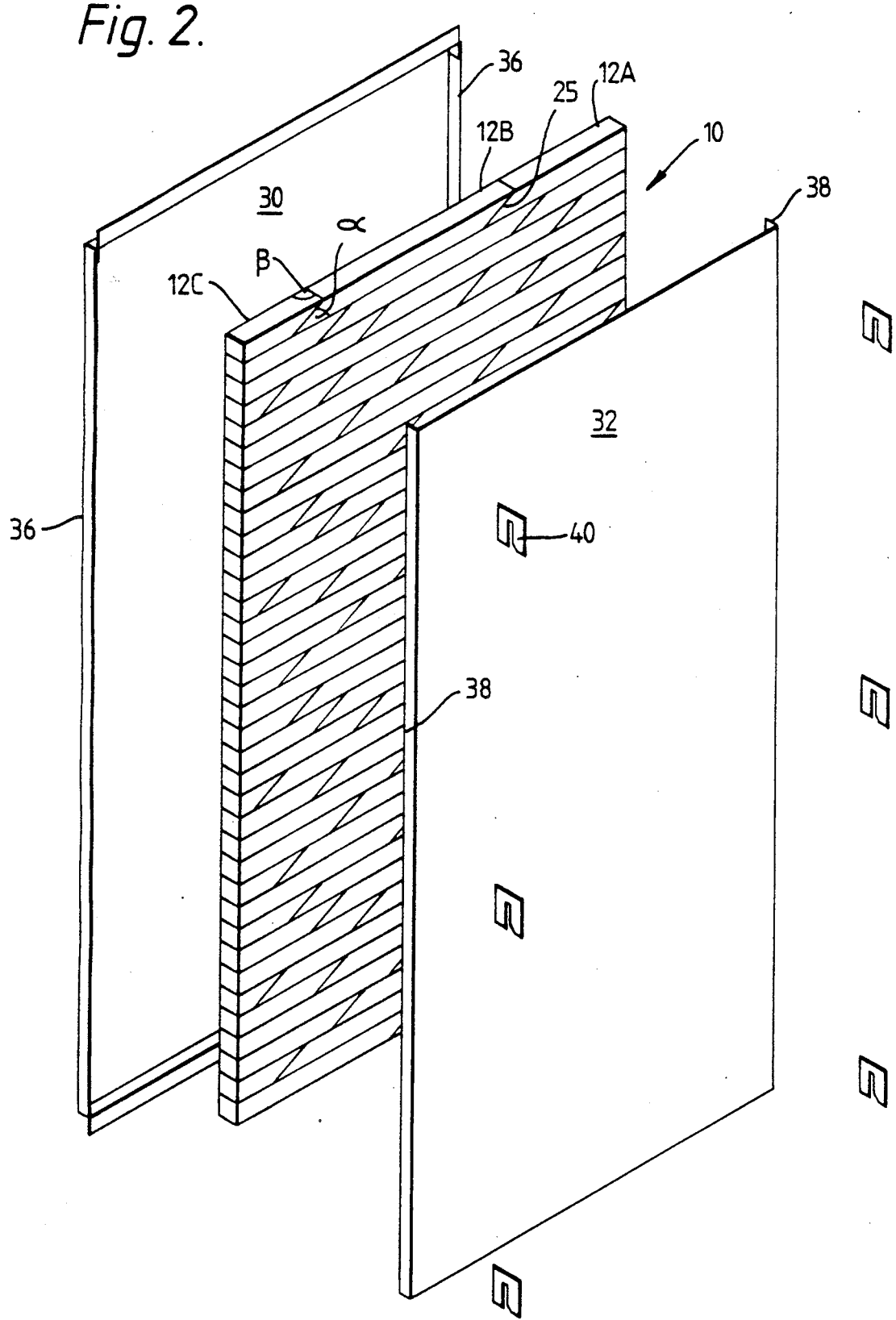

CORE ARRANGEMENT IN MINERAL WOOL SANDWICH PANEL

FIELD OF THE INVENTION

The present invention relates to a sandwich panel element.

BACKGROUND TO THE INVENTION

It has been conventional to produce sandwich panels using a mineral wool core which is sandwiched between and bonded to rigid or semi-rigid sheet material skins, often formed of aluminium. It has also been known to cut slabs of mineral wool fibers which have been compacted and treated with a binder into strips having a width corresponding to the desired distance between the facing skins and to turn the strips through 90° before bonding to the skins. In this manner, it is possible for the direction of the fibers, which run generally parallel to the length of the strips, to extend in a direction generally transverse to the planes of the skins, which greatly improves the resistance against separation of the core due to forces acting on the skins.

Since mineral wool slabs are traditionally only produced in limited lengths of say 1 to 1.2 meters, there is a need in panels which have a greater dimension than the length dimension of the core strips, to use more than one length of strip in end-to-end relation.

It has been found, when one is using thin skin material in particular, that the transverse divisions resulting from the abutting ends of the strips show through the skins in the finished panel.

SUMMARY OF THE INVENTION

It is now proposed, according to the present invention, to provide a sandwich panel element comprising a fibrous core formed of a multiplicity of fibers, said core having front and rear faces, first and second parallel outer skins of generally planar sheet material adhered to said front and rear faces, respectively, of said core and means to connect said panel to a support structure, said fibrous core being formed from a plurality of elongate strips, each strip having two sides and two ends, said strips being longitudinally arranged in side-by-side and end-to-end abutting relation, the elongate strips each being arranged so that the fibers extending generally transverse to the planes of said sheet material skins, the strips individually being shorter than the length or width of the panel element, at least the mutually abutting ends of the strips being chamfered at an acute angle to the longitudinal direction of the strip, to allow the ends to overlap.

With such a structure, the problem of the abutting strip ends showing through the skins of the finished panel is removed or greatly reduced. Particularly advantageous results arise in this connection if the acute angle is less than 45 and preferably is in the region of 30°. The strip material can be cut so that the chamfered ends extend in any plane but in a preferred construction, the plane of the chamfered ends is perpendicular to the planes of the sheet material.

Advantageous results can be achieved if the longitudinal ends of the strips in adjacent rows are staggered with respect to each other and moreover, if the strips are arranged so that their length is parallel to the length dimension of the panel.

While the core material may take any form, it is preferably constructed of mineral wool.

BRIEF DESCRIPTION OF THE DRAWINGS

In order that the present invention may more readily understood, the following description is given, merely by way of example, reference being made to the accompanying drawings in which:

FIG. 2 is an exploded perspective view of one embodiment of panel element according to the present invention.

DETAILED DESCRIPTION OF THE PRESENTLY PREFERRED EMBODIMENT

Figure 1:
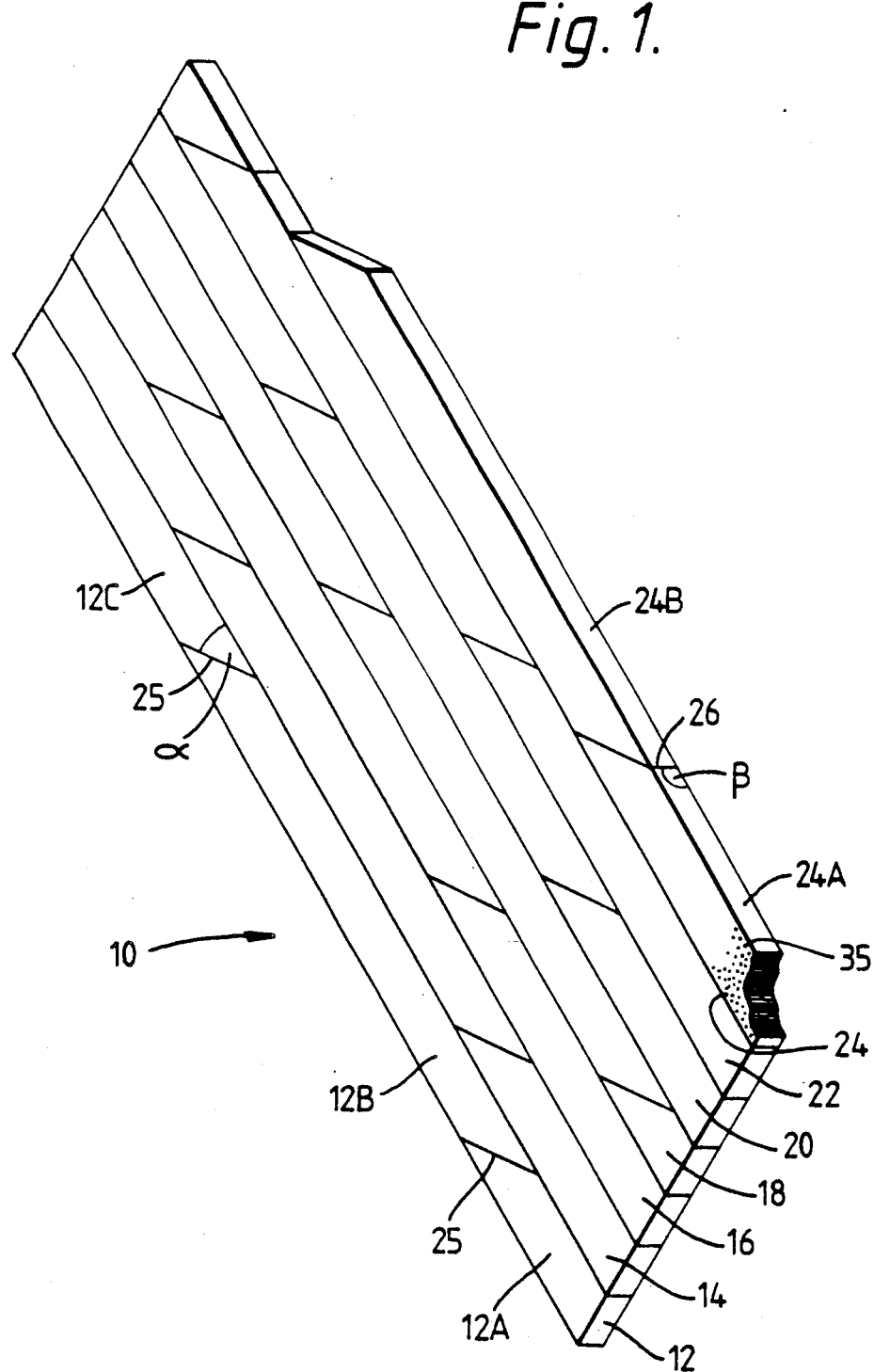
FIG. 1 is a fragmentary perspective view of a number of elongate strips of core material disposed according to the present invention, with part broken away in the corner.

If reference is first made to FIG. 1, a core of a sandwich panel is indicated by the general reference numeral 10 and consists of a number of rows of elongate mineral wool strips which have been cut from a slab of mineral wool which has been compacted and treated with binder. These strips are indicated as being formed in rows 12, 14, 16, 18, 20, 22, 24, the rows consisting of individual strips 12a, 12b, 12c etc., arranged in end-to-end relation. It will be seen that the ends 25 of the individual strips 12a, 12b, 12c etc. are arranged at an acute angle o to the longitudinal direction. As can be seen from the ends 26 of the strips 24a, 24b, the ends are cut so that they extend in a plane at an angle $\beta$ which is preferably 90°, that is to say that the ends extend in a plane perpendicular to the planes formed by the front faces of the core 10.

As can be seen from FIG. 2, the core 10 is sandwiched between front and rear skins 30, 32, in the form of generally planar sheets of material which can be adhered to the core.

It will be noted from FIG. 1 that some of the fibers 35 forming the core material have been shown, these fibers extending generally perpendicular to the planes of the front and rear sheet which improve the adhering of the core to these sheets.

FIG. 2 illustrates that the sheet 30 has a peripheral flange 36 and that sheet 32 has inturned flanges 38 on opposite longitudinal edges. Securing elements 40 forming means to connect the sandwich panel to a support structure are mounted by rivets passing through the flanges 36, 38 and 40.

I claim:

1. A sandwich panel element comprising a fibrous core formed of a multiplicity of fibers, said core having front and rear faces, first and second parallel outer skins of generally planar sheet material adhered to said front and rear faces, respectively, of said core and means to connect said panel to a support structure, said fibrous core being formed from a plurality of elongate strips, each strip having two sides and two ends, said strips being longitudinally arranged in side-by-side and end-to-end abutting relation, the elongate strips each being arranged so that the fibers extending generally transverse to the planes of said sheet material skins, the strips individually being shorter than the length or width of the panel element, at least the mutually abutting ends of the strips being chamfered at an acute angle to the longitudinal direction of the strip, to allow the ends to overlap.

2. An element as claimed in claim 1, wherein said acute angle is smaller than 45°.

3. An element as claimed in claim 2, wherein said acute angle is 30°.

4. An element as claimed in claim 1, wherein the chamfered ends of said strips extend in planes perpendicular to the planes of said sheet material skins.

5. An element as claimed in claim 1, wherein the longitudinal ends of the strips in adjacent rows of strips are staggered with respect to one another.

6. An element as claimed in claim 1, wherein the longitudinal axes of the strips are parallel to the length dimension of the panel element.

7. An element as claimed in any preceding claim, wherein the fibers of the core are mineral wool fibers.

* * * * *